United States Patent [19]

Denzinger et al.

[11] Patent Number: 5,662,781
[45] Date of Patent: Sep. 2, 1997

[54] ELIMINATION OF NITRILE IMPURITIES FROM POLYMERS

[75] Inventors: Walter Denzinger, Speyer; Heinrich Hartmann, Limburgerhof; Michael Kroener, Mannheim; Claudia Nilz, Roedersheim-Gronau, all of Germany

[73] Assignee: BASF Aktiengesellschaft, Ludwigshafen, Germany

[21] Appl. No.: 569,137

[22] PCT Filed: Jun. 27, 1994

[86] PCT No.: PCT/EP94/02082

§ 371 Date: Jan. 11, 1996

§ 102(e) Date: Jan. 11, 1996

[87] PCT Pub. No.: WO95/02615

PCT Pub. Date: Jan. 26, 1995

[30] Foreign Application Priority Data

Jul. 12, 1993 [DE] Germany .......................... 43 23 234.5

[51] Int. Cl.$^6$ .................. C07B 63/00; C08J 3/28
[52] U.S. Cl. ................ 204/158.21; 204/157.6; 522/60; 522/151; 522/152
[58] Field of Search ............... 204/157.15, 157.6, 204/157.61, 157.63, 158.2, 158.21; 522/86, 84, 60, 24, 152, 157, 173

[56] References Cited

U.S. PATENT DOCUMENTS 4,421,602 12/1983 Bruennmueller et al. .
4,774,285 9/1988 Pfohl et al. .
5,126,069 6/1992 Kud et al. .

FOREIGN PATENT DOCUMENTS 032248 8/1982 European Pat. Off. .
01174509 7/1989 Japan .

OTHER PUBLICATIONS

Japio abstract of JP 01174509 (Mitsubishi Kasei Corp.) Jul. 11, 1989.
WPIDS abstract of JP 01174509 (Mitsubishi Kasei Corp.) Jul. 11, 1989.

Primary Examiner—Kathryn L. Gorgos
Assistant Examiner—Alex Noguerola
Attorney, Agent, or Firm—Oblon, Spivak, McClelland, Maier & Neustadt, P.C.

[57] ABSTRACT

Nitrile impurities are eliminated from polymers which contain acyclic N-vinyl-carboxamide and/or vinylamine units by treating the polymers with at least one oxidizing agent a) with exposure to light and/or b) in the presence of heavy metal ions.

18 Claims, No Drawings

ELIMINATION OF NITRILE IMPURITIES FROM POLYMERS

This is a national stage application of PCT/EP94/02082.

BACKGROUND OF THE INVENTION

1. Field of the Invention

The present invention relates to a process for eliminating nitrile impurities from polymers which contain acyclic N-vinylcarboxamide and/or vinylamine units.

2. Discussion of the Background

U.S. Pat. No. 4,421,602 discloses polymers which contain N-vinylformamide and vinylamine units. The polymers are prepared by polymerizing N-vinylformamide and subsequently partially hydrolyzing the polvinylformamides by exposure to acids or bases.

EP-A-0 216 387 discloses that copolymers of 5–90 mol % of N-vinylformamide and 95–10 mol % of an ethylenically unsaturated monomer from the group comprising vinyl acetate, vinyl propionate, the $C_1$–$C_4$-alkyl vinyl ethers, N-vinylpyrrolidone, the esters, nitriles and amides of acrylic acid and methacrylic acid in at least partially hydrolyzed form, in which up to 100 mol % of the formyl groups can be eliminated from the polymer, are used as wet and dry strength enhancers for paper by being added in amounts of from 0.1 to 5% of the weight of dry fibers to the pulp before sheet formation.

Polymers containing vinylamine units are furthermore used as dispersants for pigments, as scale inhibitors for water treatment, as detergent additives, as flocculants, retention and dehydrating agents and as fixatives in papermaking. Polymers used for these purposes must not contain any physiologically unacceptable impurities. The monomers on which the polymers are based contain nitrile impurities from the preparation, such as lactonitrile or formylalanine nitrile. These impurities cannot be removed at reasonable expense, for example by distillation, in the preparation of, for example, N-vinylformamide on the industrial scale. Since the nitrile impurities do not contain double bonds, they are virtually unchanged in the free-radical polymerization of the N-vinylcarboxamides. As is disclosed in the abovementioned references, polymers containing vinylamine units are preferably prepared by hydrolyzing homo-or copolymers containing N-vinylcarboxamide units. The acid hydrolysis of poly-N-vinylcarboxamides contaminated with nitriles results in hydrogen cyanide which it is absolutely necessary to decompose before use of the polymers.

EP-B-0 032 248 discloses a process for the detoxification of cyanide-containing waste waters and reaction solutions by reaction with hydrogen peroxide in the presence of sulfur or sulfur-eliminating compounds such as sodium thiosulfate. However, polymers containing free sulfur are undesirable in papermaking.

EP-A-0 422 536 discloses that the action of hydrogen peroxide on carboxyl-containing polymers results in a reduction in the molecular weight of the polymers. The polymers which have been broken down by oxidation are used as additives to detergents.

SUMMARY OF THE INVENTION

It is an object of the present invention to remove nitrile impurities as completely as possible from polymers which contain acyclic N-vinylcarboxamide and/or vinylamine units without essentially altering the polymers.

We have found that this object is achieved by a process for eliminating nitrile impurities from polymers which contain acyclic N-vinylcarboxamide and/or vinylamine units, which comprises treating the said polymers which have nitrile impurities with at least one oxidizing agent with exposure to light and/or in the presence of heavy metal ions.

DETAILED DISCUSSION OF THE PREFERRED EMBODIMENTS

In one embodiment of the process according to the invention, N-vinylformamide polymers, or polymers which contain vinylamine units and can be prepared therefrom by hydrolysis, which have nitrile impurities are treated in the form of a solution or emulsion with hydrogen peroxide with exposure to UV radiation. In another embodiment of the process according to the invention, N-vinylformamide polymers, or polymers which contain vinylamine units and can be prepared therefrom by hydrolysis, which have nitrile impurities are treated in the form of a solution or emulsion with hydrogen peroxide and iron(II) salts. The treatment preferably takes place at 50°–90° C. The pH of the aqueous medium during the oxidative treatment of the polymers is preferably from 5 to 8.

Polymers which contain acyclic N-vinylcarboxamide and/or vinylamine units have been disclosed. As stated above, unless the monomers have been subjected to elaborate purification, they contain nitriles as impurities. The content thereof in the polymer may be up to 1% by weight and is in most cases from 0.001 to 0.1% by weight. The preparation of polyvinylamine hydrochloride is disclosed, for example, in U.S. Pat. No. 2,721,140. Partially hydrolyzed N-vinylformamide homopolymers are disclosed in U.S. Pat. No. 4,421,602 which was cited at the outset. Copolymers of acyclic N-vinylcarboxamides and other monoethylenically unsaturated monomers are disclosed in EP-A-0 216 387. In addition, copolymers of N-vinylcarboxamides and monoethylenically unsaturated carboxylic acids have been disclosed, cf. EP-A-0 438 744. The process according to the invention can be applied to all polymers which contain acyclic N-vinylcarboxamides as copolymerized units or to their hydrolysis products. Acyclic N-vinylcarboxamides are defined as compounds of the formula

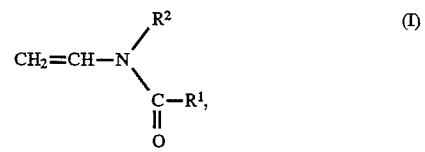

where $R^1$ and $R^2$ are identical or different and are each H or $C_1$–$C_6$-alkyl. Examples of suitable monomers are N-vinylformamide, N-vinyl-N-methylformamide, N-vinylacetamide, N-vinyl-N-methylacetamide, N-vinyl-N-ethylacetamide, N-vinyl-N-methylpropionamide and N-vinylpropionamide.

Homopolymers or copolymers can be prepared from the abovementioned monomers, eg. copolymers of N-vinylformamide and-N-vinylacetamide. The N-vinylcarboxamides described above can be copolymerized together in any ratio. Hydrolysis of the homo- or copolymers obtainable from these monomers results in polymers which contain vinylamine units and, after partial hydrolysis, also contain N-vinylcarboxamide units. The abovementioned acyclic N-vinylcarboxamides are called group a) monomers hereinafter. They can be copolymerized together with other ethylenically unsaturated monomers. Examples of group b) monomers suitable for the copolymerization are monoethylenically unsaturated carboxylic acids having 3 to 8 carbon atoms and the water-soluble salts of these monomers.

This group of monomers includes, for example, acrylic acid, methacrylic acid, dimethylacrylic acid, ethacrylic acid, maleic acid, citraconic acid, methylenemalonic acid, allylacetic acid, vinylacetic acid, crotonic acid, fumaric acid, mesaconic acid and itaconic acid. The monomers from this group which are preferably used are acrylic acid, methacrylic acid, maleic acid or else mixtures of the said carboxylic acids, especially mixtures of acrylic acid and maleic acid or mixtures of acrylic acid and methacrylic acid. Group b) monomers can be polymerized either in the form of the free carboxylic acids or in partially or completely base-neutralized form, eg. with sodium or potassium hydroxide solution, calcium hydroxide or ammonia.

Examples of other suitable group b) monomers are the esters, amides and nitriles of the stated carboxylic acids, eg. methyl acrylate, ethyl acrylate, methyl methacrylate, ethyl methacrylate, hydroxyethyl acrylate, hydroxypropyl acrylate, hydroxybutyl acrylate, hydroxyethyl methacrylate, hydroxypropyl methacrylate, hydroxyisobutyl acrylate, hydroxyisobutyl methacrylate, monomethyl maleate, dimethyl maleate, monoethyl maleate, diethyl maleate, 2-ethylhexyl acrylate, 2-ethylhexyl methacrylate, acrylamide, methacrylamide, N,N-dimethyl-acrylamide, N-tert-butylacrylamide, acrylonitrile, methacrylonitrile, dimethylaminoethyl acrylate, dimethylaminoethyl methacrylate, diethylaminoethyl acrylate, diethylaminoethyl methacrylate, dimethylaminopropylmethacrylamide and the salts of the last-mentioned monomers with carboxylic acids or mineral acids, as well as the quaternized products.

Also suitable as group b) monomers are acrylamidoglycolic acid, vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid, and phospho-containing monomers such as vinylphosphonic acid, allylphosphonic acid and acrylamidomethylpropanephosphonic acid. Other suitable compounds in this group are N-vinylpyrrolidone, N-vinylcaprolactam, N-vinyl-2-methylimidazoline, diallyldimethylammonium chloride, vinyl acetate and vinyl propionate. It is, of course, also possible to use mixtures of the said group b) monomers, eg. mixtures of acrylate and vinyl acetate, mixtures of various acrylates, mixtures of acrylates and acrylamide or mixtures of acrylamide and hydroxyethyl acrylate or mixtures of vinyl acetate and acrylonitrile.

Group b) monomers which are preferably used are acrylamide, acrylonitrile, vinyl acetate, N-vinylpyrrolidone, N-vinylimidazole, acrylic acid, methacrylic acid, maleic acid or mixtures of these monomers, eg. mixtures of acrylamide and vinyl acetate or mixtures of acrylamide and acrylonitrile. The copolymers of a) and b) can contain, for example, from 1 to 99 mol % of group b) monomers in copolymerized form.

The copolymers of monomers a) and b) can furthermore be modified by undertaking the polymerization in the presence of group c) monomers, which are compounds which contain at least two non-conjugated ethylenic double bonds in the molecule. The presence of the monomers c) in the copolymerization increases the K values of the copolymers. Examples of suitable group c) compounds are methylenebisacrylamide, esters of acrylic acid and methacrylic acid with polyhydric alcohols, such as glycerol trimethacrylate, and polyethylene glycols or polyols, such as pentaerythritol and glucose, which are esterified at least twice with acrylic acid or methacrylic acid. Suitable crosslinkers are in addition divinylbenzene, divinyldioxane, pentaerythritol triallyl ether and pentaallylsucrose. The monomers in this group which are preferably used are those which are soluble in water, such as glycol diacrylate or diacrylates of polyethylene glycols with a molecular weight of up to 3,000. When group c) monomers are employed to modify the copolymers they are used in amounts of up to, for example, 2 mol %. The copolymers then preferably contain from 0.01 to 1 mol % of them in copolymerized form.

The copolymers are prepared by conventional processes, eg. solution, precipitation, suspension or emulsion polymerization using compounds which form free radicals under the polymerization conditions. The polymerizations are usually carried out in the range from 30 to 200, preferably from 40° to 110° C. Examples of suitable initiators are azo and peroxy compounds and the conventional redox initiator systems such as combinations of hydrogen peroxide and reducing compounds, eg. sodium sulfite, sodium bisulfite, sodium formaldehyde sulfoxylate and hydrazine. These systems may additionally where appropriate also contain small amounts of a heavy metal salt. Initiators preferably used for the polymerization are water-soluble azo compounds such as 2,2'-azobis(2-methylpropionamidine) dihydrochloride, 2,2'-azobis(4-methoxy-2,4-dimethylvaleronitrile) and 2,2'-azobis(2-methyl-N-phenylpropionamidine) dihydrochloride.

Low molecular weight copolymers are prepared by carrying out the polymerization in the presence of a regulator. Examples of suitable regulators are secondary alcohols such as isopropanol and sec-butanol hydroxylamine, formic acid and mercapto compounds such as mercaptoethanol, mercaptopropanol, mercaptobutanol, thioglycolic acid, thiolactic acid, tert-butyl mercaptan, octyl mercaptan and dodecyl mercaptan. The regulators are normally used in amounts of from 0.01 to 5% of the weight of the monomers used. When secondary alcohols are used as regulators, the polymerization can also take place in the presence of considerably larger amounts, eg. up to 80% of the weight of the monomers. In these cases, the secondary alcohols simultaneously serve as solvents for the monomers.

The copolymers obtainable in this way have K values of from 10 to 300, preferably from 30 to 250. The K values are determined by the method of H. Fikentscher in 5% strength aqueous sodium chloride solution at pH 7 and 25° C. with a polymer concentration of 0.1% by weight.

The formyl groups can be eliminated from the copolymers described above by hydrolysis to form vinylamine units as shown in the following diagram:

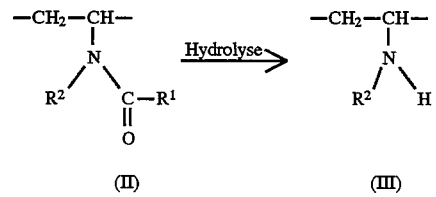

The substituents $R^1$ and $R^2$ in the formulae (II) and (III) can be identical or different and each be H or $C_1$–$C_6$-alkyl. Hydrolysis of the units II is either partial or complete depending on the conditions chosen for the hydrolysis. The hydrolysis is continued until from 1 to 100, preferably 30 to 95, % of the monomers a) present as copolymerized units in the copolymer are hydrolyzed. On hydrolysis of copolymers containing vinylformamide units, the degree of hydrolysis can be determined, for example, by polyelectrolyte titration or by enzymatic analysis of the liberated formic acid. When the copolymers contain other hydrolyzable monomers besides the monomers a), these copolymerized monomers may also be chemically altered depending on the chosen hydrolysis conditions, eg. conversion of vinyl acetate units into vinyl alcohol units, methyl acrylate units into acrylic acid units and acrylonitrile units into acrylamide or acrylic acid units.

Particularly suitable hydrolyzing agents are mineral acids such as hydrohalic acids, which can be employed in gas form or in aqueous solution. Preferably used are hydrochloric acid, sulfuric acid, nitric acid and phosphoric acid, and organic acids such as $C_1$–$C_5$-carboxylic acids and aliphatic or aromatic sulfonic acids. The pH during the acid hydrolysis is from −1 to 5, preferably 0 to 2. From 0.05 to 2, preferably 1 to 1.5, mole equivalents of acid are required per formyl group to be eliminated from the copolymerized units II for example.

The copolymerized units of structure II can also be hydrolyzed with bases, eg. metal hydroxides, especially alkali metal and alkaline earth metal hydroxides. Sodium hydroxide or potassium hydroxide is preferably used. The hydrolysis may also be carried out in the presence of ammonia or amines.

It has proven particularly suitable to hydrolyze the copolymers in aqueous solution or suspension at from 20° to 100° C. If the solubility of the unhydrolyzed copolymers in water is low, they usually dissolve in the reaction medium as hydrolysis proceeds. After an acid hydrolysis the reaction mixture is neutralized where appropriate with bases, preferably sodium hydroxide solution. If the hydrolysis has been carried out with bases, the reaction mixture can be neutralized where appropriate by adding acids, preferably hydrochloric acid. The pH of the reaction mixture after the hydrolysis can be from 1 to 10, preferably from 3 to 8. Depending on the composition, the hydrolyzed copolymers may have low solubilities in certain pH ranges. The K value of the hydrolyzed copolymers is, for example, from 10 to 300, preferably from 15 to 200 (measured in 5% strength aqueous sodium chloride solution with a polymer concentration of 0.1% by weight and at pH 5 and 25° C.).

Both the unhydrolyzed and the hydrolyzed polymers of acyclic N-vinylcarboxamides have nitrile impurities. These may be nitriles such as formylalanine nitrile or lactonitrile or other saturated nitriles which have not been identified, but may also be hydrogen cyanide. The hydrolyzed acyclic N-vinylcarboxamide polymers contain not only nitriles but also, in particular, hydrogen cyanide produced from the nitriles by hydrolysis. The nitrile content of the polymer solutions is determined by Liebig's argentometric titration with silver ions in alkaline medium at pH values above 10. In this pH range, both cyanide ions and nitriles such as easily cleaved cyanohydrins, eg. lactonitrile, are detected. The titrant employed is 0.001–0.01N silver nitrate solution. The titration endpoint is determined potentiometrically on a silver electrode. Reliable detection of hydrogen cyanide in the gas space above the polymer solution is possible using a test paper as disclosed in U.S. Pat. No. 2,573,248. The reaction is very sensitive and responds even to 1 ppm hydrogen cyanide.

In order to remove the nitrile impurities from the unhydrolyzed and the hydrolyzed polymers, the polymers are treated with at least one oxidizing agent with exposure to light and/or in the presence of heavy metal ions. Oxidizing agents which can be used are oxygen, ozone or other oxidizing agents which contain chemically bound oxygen. Examples of other suitable oxidizing agents are compounds which release oxygen on heating alone or in the presence of catalysts. Suitable organic compounds are, in general, peroxides which very easily eliminate active oxygen. Only hydroperoxides and peracids have a marked oxidizing action at low temperatures, while peresters, diacyl peroxides and dialkyl peroxides act only at elevated temperatures. Examples of suitable peroxides are diacetyl peroxide, isopropyl percarbonate, tert-butyl hydroperoxide, cumene hydroperoxide, acetylacetone peroxide, methyl ethyl ketone peroxide, di-tert-butyl peroxide, dicumene peroxide, tert-butyl perpivalate, tert-butyl peroctanoate and tert-butyl perethylhexanoate. Preferred inorganic oxidizing agents are those of low cost which are particularly suitable for oxidizing aqueous solutions, emulsions or dispersions of polymers containing vinylcarboxamide and/or vinylamine groups. Examples which may be mentioned are chlorine, bromine, iodine, nitric acid, potassium permanganate, potassium chlorate, sodium hypochlorite, sodium perborate, sodium percarbonate and sodium persulfate. A particularly preferred oxidizing agent is hydrogen peroxide. The decomposition of peroxy compounds can be promoted by addition of accelerators or activators. These accelerators or activators are reducing substances which readily release electrons, such as amines, sulfinic acids, dithionites, sulfites, α- and β-keto carboxylic acids and glucose derivatives. Examples of compounds of these types are dimethylaniline, dimethyl-p-toluidine, diethylaniline, sodium dithionite, sodium sulfite, ascorbic acid, glucose and pentaacetylglucose.

The oxidizing agents are used in amounts which are at least equimolar to those of the nitrile impurities. This means that the oxidizing agents are employed, for example, in amounts of from 0.01 to 5, preferably 0.05 to 1, % of the weight of the polymers. When a reducing agent is used to activate the oxidizing agents, the amount of reducing agent is from 1 to 50% of the weight of oxidizing agent.

The action of an oxidizing agent alone on the nitrile impurities takes place too slowly or requires elevated temperatures. However, at elevated temperatures there are adverse effects on the polymers to be purified. This is why the polymers from which nitriles are to be removed are treated with at least one oxidizing agent and additionally exposed to light. Exposure to light means, in particular, exposure of the polymer to be purified to UV radiation. Suitable for this purpose are all the UV radiation sources used in industry, eg. high-energy UV lamps such as carbon arc lamps, mercury vapor lamps or xenon lamps, and low-UV light sources such as fluorescent tubes with a high blue content as well as sunlight.

In order to remove the nitriles from the polymers to be purified, they can also be exposed to the oxidizing agent in the presence of heavy metal ions. Suitable heavy metal ions are those derived, for example, from iron, copper, chromium, manganese, nickel, cobalt, vanadium and cerium. These ions can be employed, for example, as acetylacetonate complexes or in the form of salts, eg. iron(II) sulfate, iron(II) ammonium sulfate, copper chloride or copper sulfate. The use of iron(II) salts as heavy metal ions is particularly preferred. The heavy metal ions are employed, for example, in amounts of from 0.1 to 100, preferably 0.5 to 20 ppm of the polymers to be purified. When oxidizing agents and heavy metal ions are used to remove the nitrile impurities, the reaction can also be carried out without exposure to light. However, the rate is increased on exposure to light, especially UV radiation. The reaction can be carried out at, for example, from 5 to 100, preferably 50° to 90° C.

In order to decompose the nitrile impurities in the polymers, the oxidizing agents are allowed to act, a) with exposure to light and/or b) in the presence of heavy metal ions, either directly on the powdered polymers or on suspensions or emulsions of the polymers in an inert suspending agent or on solutions of the polymers in inert solvents. Examples of suitable solvents for the polymers are methanol, ethanol, n-propanol, isopropanol, water and mixed solvents containing water. The oxidation of the impurities is preferably carried out in aqueous polymer solutions, emulsions or dispersions. In this case, the solution to be treated is adjusted to pH 4–12, preferably 5–8. The elimination, according to the invention, of nitrile impurities from the said polymers is complete after from 5 minutes to 10 hours, for example. Since the oxidizing agents are employed in excess, they are preferably decomposed after the treatment of the polymer solutions. This can take place, for example, by adding suitable reducing agents, for example sodium sulfite, sodium bisulfite, sodium dithionite, sodium phosphite, sodium hydrogen phosphite, sodium hypophosphite or ascorbic acid. Unused hydrogen peroxide, which is preferably employed as oxidizing agent, can be removed enzymatically with catalase, which is particularly straightforward.

The polymers which contain acyclic N-vinylcarboxamide and/or vinylamine units and have been treated according to the invention contain either no or only traces of nitrile impurities, which no longer interfere with the further processing of the polymers. The polymers are virtually unchanged by the elimination of the nitrile impurities. In the cases tested to date they are just as effective as the untreated polymers for use as retention agents and strength enhancers for paper.

In the Examples, the K values were determined in accordance with the H. Fikentscher reference given in the description. The viscosity of the copolymers was measured in a Brookfield viscometer at 20 rpm and 23° C.

EXAMPLE 1

650 g of a 15.2% strength aqueous solution of a polvinylformamide of K value 82.6, pH 6.7, a viscosity of 5500 mPa.s and a CN content determined by the Liebig method of 74.3 ppm are heated in a glass reactor equipped with a stirrer under a gentle stream of nitrogen to 70° C.

As soon as this temperature is reached, 0.98 g of 50% strength hydrogen peroxide is added with stirring, and the mixture is stirred at 70° C. for 2 hours while exposing to daylight. The mixture is then left to cool. The solids content of the aqueous polymer solution is 15.0%, and the viscosity is 5300 mPa.s. The polymer has a K value of 82.3. No nitrile was detectable.

In order to decompose the remaining hydrogen peroxide, 0.4 g of sodium bisulfite was added to the polymer solution. The polymer was then heated with 1.2 times the molar amount of hydrochloric acid at 70° C. for 5 hours. After the hydrolysis, cyanide was not detectable either in the solution or in the gas space.

EXAMPLE 2

1200 g of a 15.8% strength aqueous solution of a polvinylformamide of K value 82.4, pH 6.5, a viscosity of 6200 mPa.s and a cyanide content determined by the Liebig method of 17 ppm are heated to 80° C. in a stainless steel reactor equipped with a stirrer and metering devices under a stream of nitrogen. After this temperature is reached, 5 g of a 0.1% strength aqueous solution of iron(II) sulfate and subsequently 1.836 g of 50% strength hydrogen peroxide, are added, and the mixture is stirred at 80° C. for 2 hours and then left to cool. The aqueous solution has a solids content of 15.6% and a viscosity of 6100 mPa.s. The K value of the polymer is 82.0 and the nitrile content determined by the Liebig method is less than 1 ppm.

The polyvinylformamide is subsequently hydrolyzed by adding 1.2 times the amount of hydrochloric acid and heating at 70° C. for 5 hours. No hydrogen cyanide is detectable in the gas space of the aqueous solution of the hydrolyzed polymer. The polymer solution contains about 1 ppm titratable nitrile.

EXAMPLE 3

1200 g of a 15.8% strength aqueous solution of a polyvinylformamide of K value 82.4, pH 6.5, a viscosity of 6200 mPa.s and a CN content determined by the Liebig method of 17 ppm are heated to 50° C. in the reactor described in Example 2 under a stream of nitrogen. At this temperature, 1.836 g of 50% strength hydrogen peroxide are added, and the mixture is stirred while exposing to UV light at 50° C. for 1 hour. After this time, 2 ppm titratable nitrile are still detectable in the polymer solution. No hydrogen cyanide was detectable in the gas space.

EXAMPLE 4

500 g of an aqueous 6% strength solution of a completely hydrolyzed copolymer of N-vinylformamide and vinyl acetate, which contains vinylamine and vinyl alcohol units in the molar ratio 3:1, are introduced into a glass reactor equipped with a stirrer and a metering device. The aqueous solution has a pH of 6, a viscosity of 3000 mPa.s and a titratable CN content of 39 ppm. The K value of the copolymer is 122. 1.5 g of a 0.1% strength aqueous iron(II) sulfate solution and 0.9 g of 30% strength hydrogen peroxide are added, and the mixture is heated at 70° C. while stirring continuously under a gentle stream of nitrogen for 4 hours. The viscosity of the aqueous polymer solution after cooling is 2950 mPa.s. The copolymer has a K value of 122 and a nitrile content of less than 3 ppm. The excess hydrogen peroxide is subsequently decomposed by adding 4 g of a 30% strength sodium bisulfite solution.

We claim:

1. A process for eliminating nitrile impurities from polymers which contain acyclic N-vinylcarboxamide and/or vinylamine units, which comprises treating the polymers containing nitrile impurities from starting materials with at least one oxidizing agent and with exposure to light.

2. The process of claim 1, wherein said acyclic N-vinylcarboxamide is selected from the group consisting of N-vinylformamide, N-vinyl-N-methylformamide, N-vinylacetamide, N-vinyl-N-methylacetamide, N-vinyl-N-ethylacetamide, N-vinyl-N-methylpropionamide and N-vinyl propionamide.

3. The process of claim 1, wherein said polymers further contain units of other ethylenically unsaturated monomers copolymerizable with said acyclic N-vinylcarboxamide and/or vinylamine units.

4. The process of claim 1, which comprises treating N-vinylformamide polymers, or polymers which contain vinylamine units and are prepared therefrom by hydrolysis, containing nitrile impurities, in the form of a solution or emulsion with hydrogen peroxide and with exposure to UV radiation.

5. The process of claim 1, which is carried at from about 50° to 90° C.

6. The process of claim 1, which is carried out in an aqueous medium at a pH of about 5 to 8.

7. The process of claim 1, wherein said at least one oxidizing agent is selected from the group consisting of oxygen, ozone, peroxides, hydroperoxides, peracids, peresters, chlorine, bromine, iodine, nitric acid, permanganates, chlorates, hypochlorites, perborates, percarbonates and persulfates.

8. The process of claim 1, wherein said at least one oxidizing agent is used in an amount of from about 0.01 to 5% by wt. based upon the weight of the polymers.

9. The process of claim 8, wherein said at least one oxidizing agent is used in an amount of from about 0.05 to 1% by wt. based upon the weight of the polymers.

10. A process for eliminating nitrile impurities from polymers which contain acyclic N-vinylcarboxamide and/or vinylamine units, which comprises treating the polymers containing nitrile impurities from starting materials with at least one inorganic oxidizing agent and (a) with exposure to light or (b) with heavy metal ions or both (a) and (b).

11. The process of claim 10, which comprises treating N-vinylformamide polymers, or polymers which contain vinylamine units and are prepared therefrom by hydrolysis, containing nitrile impurities, and in the form of a solution or emulsion, with hydrogen peroxide and iron (II) salts.

12. The process of claim 10, which is carried out at from 50° to 90° C.

13. The process of claim 10, which is carried out at an aqueous medium at a pH of about 5 to 8.

14. The process of claim 10, wherein said acyclic N-vinylcarboxamide is selected from the group consisting of N-vinylformamide, N-vinyl-N-methylformamide, N-vinylacetamide, N-vinyl-N-methylacetamide, N-vinyl-N-ethylacetamide, N-vinyl-N-methylpropionamide and N-vinyl propionamide.

15. The process of claim 10, wherein said polymers further contain units of other ethylenically unsaturated monomers copolymerizable with said acyclic N-vinylcarboxamide and/or vinylamine units.

16. The process of claim 10, wherein said at least one inorganic oxidizing agent is selected from the group consisting of oxygen, ozone, hydrogen peroxide, chlorine, bromine, iodine and nitric acid.

17. The process of claim 10, wherein said at least one oxidizing agent is used in an amount of from about 0.01 to 5% by wt. based upon the weight of the polymers.

18. The process of claim 17, wherein said at least one oxidizing agent is used in an amount of from about 0.05 to 1% by wt. based upon the weight of the polymers.

\* \* \* \* \*